(12) United States Patent
Morgan (10) Patent No.: US 12,330,997 B2
(45) Date of Patent: Jun. 17, 2025

(54) CONCRETE FORMULATIONS, STRUCTURES, AND INLAYS AND METHODS THEREFORE

(71) Applicant: Andrew Morgan, Denton, TX (US)

(72) Inventor: Andrew Morgan, Denton, TX (US)

( * ) Notice: Subject to any disclaimer, the term of this patent is extended or adjusted under 35 U.S.C. 154(b) by 185 days.

(21) Appl. No.: 17/992,702

(22) Filed: Nov. 22, 2022

(65) Prior Publication Data

US 2024/0166568 A1 May 23, 2024

(51) Int. Cl.
*C04B 41/50* (2006.01)
*C04B 28/04* (2006.01)
*C04B 41/00* (2006.01)
*C04B 41/45* (2006.01)
C04B 103/10 (2006.01)
C04B 103/30 (2006.01)

(52) U.S. Cl.
CPC .......... *C04B 41/5079* (2013.01); *C04B 28/04* (2013.01); *C04B 41/009* (2013.01); *C04B 41/4509* (2013.01); *C04B 41/4539* (2013.01); C04B 2103/10 (2013.01); C04B 2103/30 (2013.01)

(58) Field of Classification Search
CPC ... C04B 41/5079; C04B 28/04; C04B 41/009; C04B 41/4509; C04B 41/4539
USPC .......................................................... 428/172
See application file for complete search history.

(56) References Cited

U.S. PATENT DOCUMENTS

| | | | |
|---|---|---|---|
| 5,932,344 A * | 8/1999 | Ikemoto | C04B 41/009 525/445 |
| 10,526,248 B2 | 1/2020 | Guynn | |
| 2005/0238426 A1 | 10/2005 | Seroka et al. | |
| 2008/0229703 A1 | 9/2008 | Driscoll | |
| 2008/0271662 A1 | 11/2008 | Driscoll et al. | |
| 2013/0315666 A1* | 11/2013 | Baumgartner | B44C 1/26 404/75 |
| 2017/0170192 A1 | 6/2017 | Yune | |
| 2018/0230057 A1* | 8/2018 | Guynn | C04B 14/42 |

* cited by examiner

*Primary Examiner* — Tahseen Khan
(74) *Attorney, Agent, or Firm* — Conley Rose, P.C.; Michael W. Piper; Andrew M. Metrailer (57) ABSTRACT

A process for forming an inlay in a cured concrete structure includes forming a pocket in a preexisting concrete structure, filling the pocket with a cementitious mixture, curing the mixture in the pocket to form a cured mixture, and polishing the cured mixture in the pocket. The cementitious mixture includes a Portland cement, an admixture comprising at least one of a strengthener, a plasticizer, or an accelerator, and an aggregate.

20 Claims, 4 Drawing Sheets

CONCRETE FORMULATIONS, STRUCTURES, AND INLAYS AND METHODS THEREFORE

CROSS-REFERENCES TO RELATED APPLICATIONS

Not applicable.

TECHNICAL FIELD

The present disclosure relates to an uncured concrete composition, a cured concrete composition, an inlay, an article with an inlay, and processes relating thereto.

BACKGROUND

Often, concrete is used for construction materials. Concrete can be used for walls and floors in, e.g., buildings. In some instances, such concrete forms are decorated. However, there is difficulty in creating decorative inlays that are formed smooth with and remain in the surrounding concrete, and are durable. These shortcomings can be particularly true if the inlay is formed in a preexisting cured concrete form. As an example, staining or sealing a decorative impression on an existing concrete form can have insufficient longevity as the stain or seal can wear or fade in just a few years. As such, such stains or seals may not be functional for the particularly purpose, e.g., a decorative impression in a high foot-traffic walkway. Alternatively, sometimes other materials, such as wood, are used for the concrete inlay. However, the different material densities between the inlay and concrete can result in the inlay having excessive buoyance and not remaining within the concrete structure. Moreover, there is a demand that the inlay contribute artistically to the surrounding environment yet be formed seamlessly therein. Thus, decorative inlays that can be formed seamlessly with and have sufficient longevity to last as long as the surrounding existing are desired.

SUMMARY

In some embodiments, a process for forming an inlay in a cured concrete structure comprises forming a pocket in a preexisting concrete structure, filling the pocket with a cementitious mixture, curing the mixture in the pocket to form a cured mixture, and polishing the cured mixture in the pocket. The cementitious mixture comprises: a Portland cement, and optional pozzolanic material, an admixture comprising at least one of a strengthener, a plasticizer, or an accelerator, and an aggregate.

In some embodiments, a composite having an inlay and a preexisting concrete structure comprises a pocket formed in the preexisting concrete structure, a cured mixture disposed in the pocket and bonded to the preexisting concrete structure. The cured mixture made by comprises a cementitious mixture comprising a portland cement comprising two or more oxides of silicon, iron, aluminum, calcium, magnesium, sulfur, potassium, and sodium, and a silica fume, and at least one admixture comprising a strengthener, a plasticizer, and an accelerator, and an aggregate. The uncured concrete composition is selected to be visually distinguishable from the preexisting concrete structure and with a particle size distribution for inlaying in the preexisting concrete structure.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Various concrete forms or structures can be made using different types of aggregates. Since the aggregate can be exposed in the final product, the aggregate can form a part of the decorative nature of the concrete article. The aggregate can form an integral part of the final concrete structure as well as contributing to the strength of the concrete. Using specific formulations, various types of aggregates such as precious or semi-precious stones can be used as all or a portion of the aggregate to provide a final decorative finish. The concrete forms or structures can be polished to reveal the aggregate, and the formulations can provide for a desired strength in the finished product.

In some embodiments, the concrete structure can be in the form of an inlay disposed in a preexisting cured concrete form. In one instance, the concrete form can be a preexisting concrete form that may be cut or etched to create a pocket filled with an uncured concrete mixture to form an inlay. In another instance, the concrete form can be cured with a stencil inserted therein. Removing the stencil can create a pocket that may be filled with uncured concrete mixture to create the inlay. The aggregate for the inlay can be specifically sized to fill the pocket with a minimum of material and facilitate the smoothing of the inlay to correspond to the surface of the surrounding concrete. Various post-curing processes can then be used to produce a desired finish on the inlay material.

The concrete structure can be formed from an uncured concrete composition that may comprise various components including a cementitious mixture, at least one admixture, and an aggregate in an uncured form, and combined with an aqueous fluid and allowed to cure to result in a cured concrete structure. The composition of the uncured concrete composition can generally be the same when a structure is formed and when used as an inlay, though some differences in the relative amounts of the components may exist as described in more detail herein.

The cementitious mixture can include a cement comprising two or more oxides of silicon, iron, aluminum, calcium, magnesium, sulfur, potassium, and sodium. An optional pozzolanic material such as a silica fume can also be included. When present, the pozzolanic material can help to increase the density of the final structure, but it is optional and may not be present in some aspects. In some embodiments, the Portland cement component can be a white Portland cement and/or a gray Portland cement. The pozzolanic material such as a silica fume can be a microsilica and obtained from any suitable source, including a silica fume sold under the trade designation Z3-95 by Trinic LLC, of Kirkwood, New York (hereinafter "Trinic"). The cementitious mixture can include about 50 percent (%) to about 99%, about 60% to about 90%, or about 75 to about 85%, by weight, of the cement; and about 1 to about 20%, about 3 to about 17%, or about 6 to about 12%, by weight, of the pozzolanic material, based on the total weight of the cementitious mixture.

Additionally, various additional components such as admixtures can be provided such as a strengthener, a plasticizer, and/or an accelerator. The strengthener, plasticizer, and accelerator can be obtained from any suitable source, including a strengthener sold under the trade designation TEC 10, a plasticizer sold under the trade designation PLASTICIZER, and an accelerator sold under the trade designation STAGE II all from Trinic. The strengthener may be used with a glass reinforced concrete. The at least one admixture may include about 1% to about 10%, about 2% to about 8%, or about 2% to about 5%, by weight, of the strengthener; no more than about 5%, no more than about 3%, or about 0.5% to about 1.5%, by weight, of the plasticizer; and about 1% to about 10%, about 2% to about 8%, or about 2% to about 5%, by weight, of the accelerator, based on the total weight of the cementitious mixture.

Optionally, a pigment, such as an integral pigment, may be use in a suitable amount, such as up to about 10%, up to about 9%, up to about 8%, up to about 7%, up to about 6%, or up to about 5%, by weight, based on the total weight of the cementitious mixture. In any suitable embodiment, a pigment, such as an integral pigment, may be used in an amount of about 1% to about 10%, about 2% to about 10%, about 3% to about 10%, about 4% to about 10%, or about 5% to about 10%, by weight, based on the total weight of the cementitious mixture.

The aggregate can include particles having different average diameters. In some aspects, the aggregate can comprise rock or stone as well as sand-sized particles or fine aggregate. In some embodiments, the aggregate can be a structural aggregate and the aggregate blend can be sized based on the intended thickness of the structure or inlay. Including a large percentage of fine aggregate can increase the total surface area permitting the cementitious mixture to contact and bind. Aggregates can include any type of stone or rock. In some aspects, the aggregates can comprise precious or semi-precious stones such as green or blue apatite, granite, marble, amethyst, citrine, fuchsite, garnet, pink, rose, or green quartz, basalt, dolomite, sapphire, ruby, tourmaline, zircon, beryl, chrysoberyl, opal, topaz, fluorite, and/or other types of stones.

The aggregate can include particles of varying sizes. In some embodiments, the aggregate can have an average diameter, and the average diameter may be less than or equal to one-third of a thickness of a concrete structure and/or the inlay in the pocket (e.g., a thickness of the pocket). In some embodiments, the aggregate can include fine particles of no more than about 0.32 centimeter (cm) (0.125 inch (in.)) and larger, coarse particles of about 0.32 cm (0.125 in.) to no more than about 1.3 cm (0.5 in.). For inlays, the aggregate can include a first portion having an average diameter between about one-third to one-sixth of a thickness of a corresponding pocket, and a second portion having an average diameter between about one-fiftieth to about one-sixth of the thickness of the corresponding pocket in some aspects. The first portion can include between about 40% to about 60% by volume of the aggregate, and the aggregate can be included in an amount between about 60% to about 80%, by volume, of the uncured concrete mixture. In some embodiments, the uncured concrete composition can include a weight ratio of aggregate to cementitious mixture of about 9:1 to about 1:9, about 8:1 to about 1:8, about 1.5:1 to about 4:1, about 1:1 to about 7:3, about 7:3, or about 1:1. In some embodiments, the uncured concrete composition can include about 10% to about 70%, about 20% to about 60%, or about 25% to about 55%, by weight, of the cementitious mixture; and about 30% to about 90%, about 40% to about 80%, or about 45% to about 75%, by weight, of the aggregate, based on the total weight of the cementitious mixture and aggregate.

The cementitious mixture can be formulated to have a coefficient of expansion that is close to the coefficient of expansion of aggregate. In some embodiments, a coefficient of expansion of the aggregate can be within about 10%, within about 7%, or within about 5% of a coefficient of expansion of the cementitious portion. When present as an inlay, cured mixture can have a coefficient of expansion that is close to the coefficient of expansion of the surrounding concrete, and in some embodiments, the coefficient of expansion of the inlay can be less than that of the surrounding concrete. In some embodiments, a coefficient of expansion of the cured mixture can be within about 10%, within about 5%, or less than a coefficient of expansion of the surrounding concrete structure.

The aggregate can include selective mixes of rock or stone. In some embodiments, aggregate can be obtained from different color rocks, e.g., white, blue, black, green, pink, red, etc., and be reduced with a tile saw to about 3 in. (about 8 cm) strips, and afterwards, may be fed into a rock crusher sized for the particular concrete and thickness of the inlay. In some embodiments, aggregate is sized to smaller diameters or sizes for smaller designs and to larger diameters or sizes for larger designs. In some embodiments, the process can be scalable to larger forms to, e.g., specified colors of inlays to match preexisting logos, mascots, etc.

Additional structural components can be added in addition to the aggregate. For example, various types of fiberglass reinforcement can be added in addition to or in place of a portion of the aggregate. In some embodiments, an alkaline resistant glass fiber may be included in an amount of no more than about 1%, no more than about 0.5%, or no more than about 0.1%, by weight, based on the total dry weight.

An effective amount of an aqueous fluid can be included with the uncured concrete composition. In some aspects, the aqueous fluid can be water. The amount of aqueous fluid can be about 15% to about 30%, about 19% to about 25%, about 20% to about 22%, or about 21%, by weight, based on the amount of the cementitious mixture. In some embodiments, the moisture content (or lack thereof) may be contained in an aggregate, such as damp sand, compared to e.g., rock or stone, and the overall amount of the aqueous fluid added can be adjusted based on any moisture already present in the other components (e.g., the aggregate). In some embodiments, the aggregate may wick aqueous fluid into fine cracks and crevices in the stone, and the amount of aqueous fluid added may be adjusted to account for any such wicking or absorption by the aggregate or other components.

In some embodiments, about 30% to about 50%, by weight of the water in the mixture, may be replaced with a bonding agent. Various bonding agents for cement and concreate can be used such as a water-based polymer fortifier for hydration. For example, acrylic based bonding agents, and other polymer and solvent based bonding agents can be used. In some embodiments, polymeric particles such as acrylic particles from the bonding agent can help fill pores, potentially aiding in stain resistance and even may offer at least some flexural and/or tensile strength after the water evaporates. In some embodiments, a suitable bonding agent is sold under the trade designation SIKA from Sika Corp. of Lyndhurst, NJ.

The aqueous fluid can initiate a cure of the uncured concrete composition of one or more reaction products in the cured concrete composition. In some embodiments where the mixture is used for an inlay, a water bonding agent may be further diluted (up to about 50%, by weight) and used to dampen the preexisting concrete substrate at, e.g., the interior of a pocket, and the uncured concrete can be filled in the pocket before the preexisting concrete substrate dries. In some embodiments, excess aqueous fluid can be reduced or minimized to reduce the likelihood of the inlay having excessive shrinkage and pulling away from the preexisting concrete.

Concrete structures can be formed using the formulations provided herein by combining the various components, casting the mixture in place or using a mold, allowing the composition to cure, and then performing one or more optional finishing processes such as cleaning, polishing, etching, and/or sealing the concrete. To start the dry components can be combined, including any of those described herein with respect to the dry composition such as the Portland cement, the optional pozzolanic material, aggregate, and optional strengtheners, plasticizers, accelerators, or other solids such as glass fibers. The aqueous component can then be added to form a slurry.

The mixture can then be cast into a number of shapes or molds to obtain the shape of the final structure. The mold may not be the exact shape of the final structure, and in some embodiments, the mold or cast may be larger than the final structure. For example, the mold may be larger than the final structure by an amount sufficient to allow the cured composition to be polished to between about 30-90% of the thickness of the largest aggregate. The mold can include any suitable shapes such as countertops, sinks, flooring, planks, siding, decorative objects (e.g., statues, moldings, etc.), game boards (e.g., chess board, cornhole, etc.), or the like. The structure may have a minimum thickness between about 0.25 in and about 1 in. while the structure may have any suitable maximum thickness based on the end use of the structure. In some embodiments, the structure may have a maximum thickness of up to about 3 inches, about 2 inches, or about 1.5 inches. Once cast, the composition can then be allowed to cure.

Once cured, the mold or cast may then be removed. For example, the mold may be a reusable mold such as a rubber or polymeric mold. In some aspects, the mold may comprise a one-time use mold such as a wooden or clay mold, and the mold may be destroyed when removed. The final object can then be further processed once removed from the mold. Various processes such as cleaning, polishing, etching, and/or sealing the concrete may be performed to complete the structure. In some aspects, the structure can be etched or polished in order to remove an outer layer of the cured concrete to expose the aggregate. An amount of the cured composition may be removed to a thickness between about 10%-80% or between about 15%-60% of the thickness of the thickest aggregate to allow a full width of the aggregate to be exposed. In some embodiments, between about $\frac{1}{16}^{th}$ inch to about $\frac{1}{4}^{th}$ inch, or about $\frac{1}{8}^{th}$ inch of the cured composition may be removed. This may allow the final surface to show the aggregates as a decorative feature. In some aspects, a final sealer can be used on the final structure.

Figure 1:
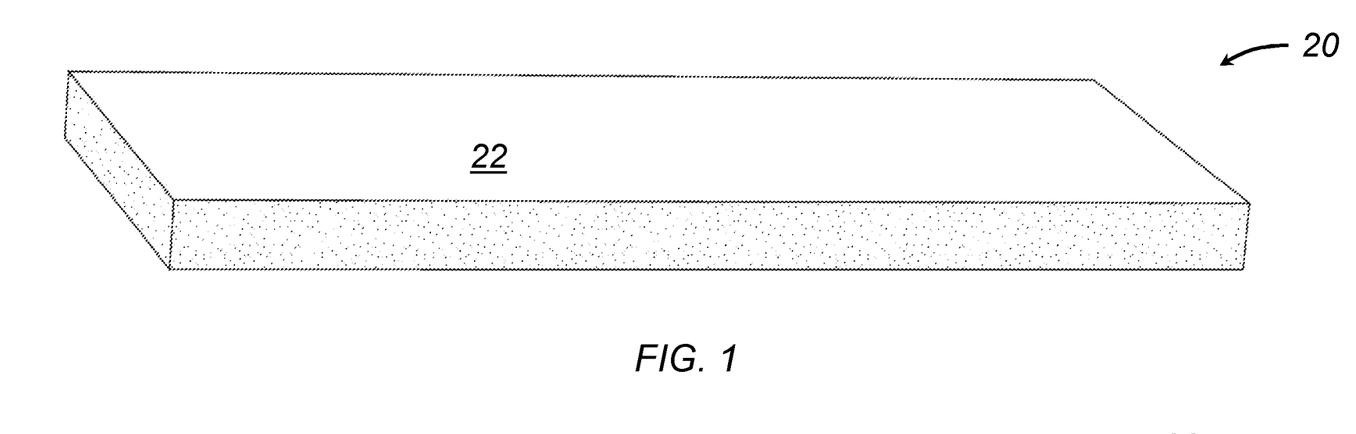
FIG. 1 is a perspective view of an embodiment of a process for a preexisting concrete structure.
Figure 2:
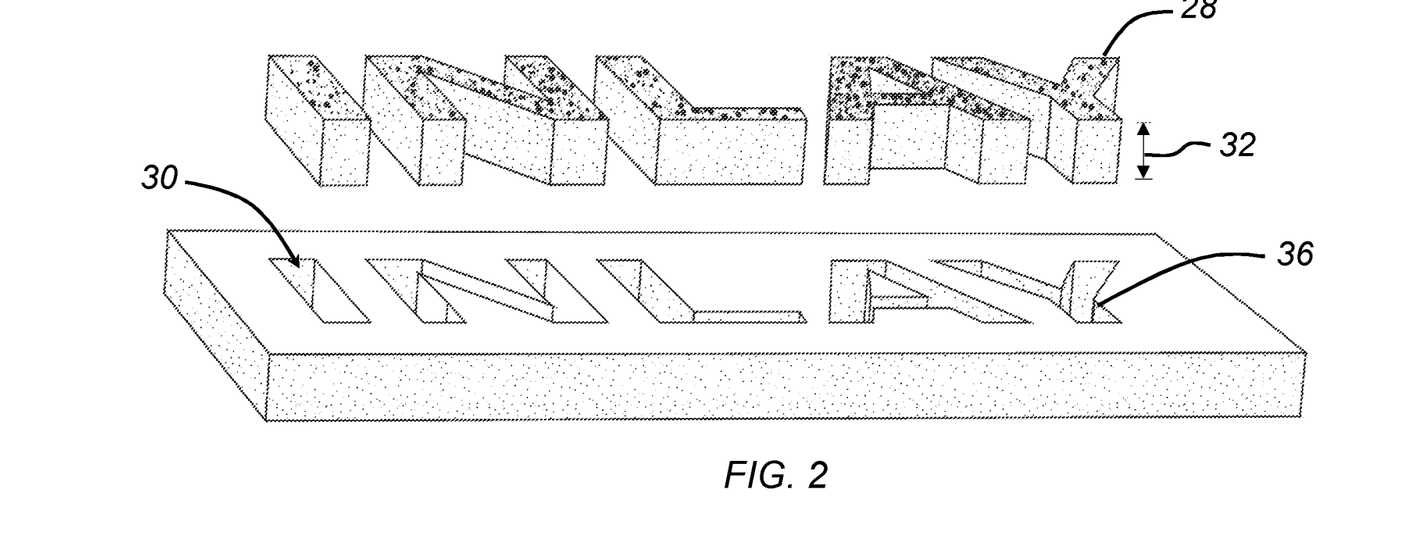
FIG. 2 is a perspective view of an embodiment of the process of the preexisting concrete structure with a removed piece revealing a pocket.

In some aspects, the formulations disclosed herein can be used to form an inlay within an existing concrete or cement structure. Referring to FIGS. 1-2, a process for creating a decorative inlay to a preexisting or cured cement or concrete form or structure 20 having a surface 22 may be implemented in some embodiments. The concrete structure 20 can be an object, a structure (e.g., including any of those formed with the mixtures as described herein), or a wall or floor in any suitable structure, such as a building. In some embodiments, the concrete structure 20 may be a countertop, a sink, or a table top. The cement or concrete structure 20 can include any suitable cured cement or concrete. Using a tool such as a saw, bit, or nozzle, a portion or piece 28 may be removed from the structure 20 revealing a pocket 30. Although a tool such as a saw is described, any suitable mechanical or chemical mechanism may be used to create the pocket 30. For example, water jets, concrete router bits, and the like can also be used to remove a portion of the existing concrete to form the pocket 30. In some embodiments, the pocket 30 can be formed by etching. The pocket 30 can have a thickness 32 (corresponding to a thickness of the piece or pieces removed—and illustrated in FIG. 2 on the removed portion for illustration only) and a edge 36 and be any suitable dimension. In some embodiments, the pocket 30 may have a thickness between about 0.25 centimeter (cm) (0.1 inch (in.)) to about 1.91 cm (0.75 in.).

In some aspects, a computerized numerical control (CNC) machine may be used to form the pocket in the cement or concrete structure 20. In these aspects, reference points may be established on an existing structure 20, and supports can be aligned with the reference points. The CNC machine can then control the positioning of the tool to precisely control the depth and shape of the pocket formed in the structure 20. Larger structures can be formed by forming the pocket in portions, with the supports being moved as necessary to complete the overall pocket shape. Any shape, including those having complex outlines and inclusions can be formed using the CNC machine to form the pocket.

The resulting pocket may have a relatively uniform depth across the surface of the pocket. In some aspects, the pocket can have a thickness 32 (e.g., from the bottom of the pocket to a surface level with the surface of the original structure 20 of between about 0.1 in. to about 1 in. The pocket may have a roughened surface to improve bonding to the compositions described herein. In some aspects, the pocket may have a concave edge when viewed from the opening to the pocket such that the transition between the inner edge of the pocket and the bottom of the pocket has a rounded shape.

Figure 3:
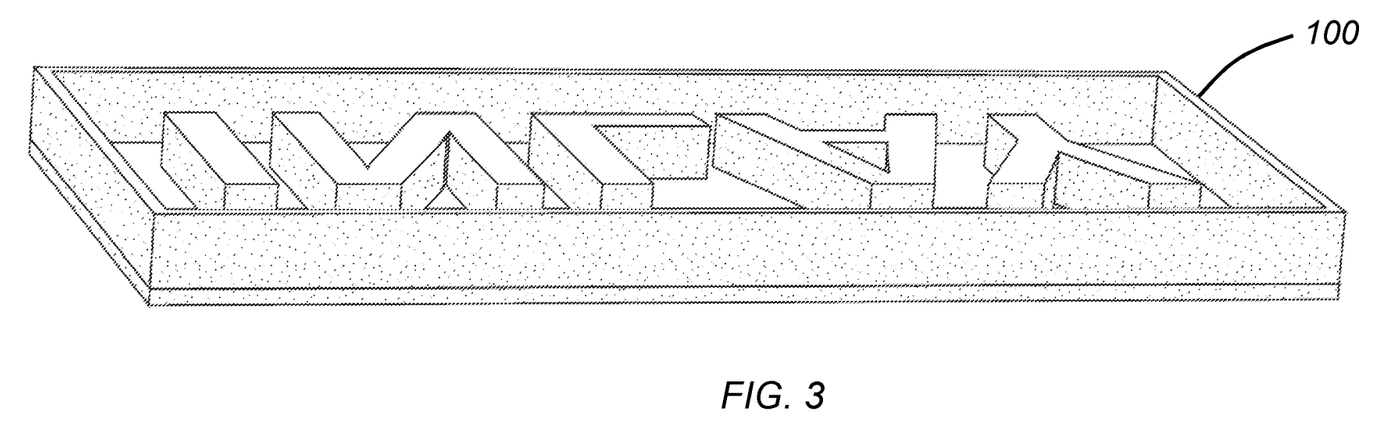
FIG. 3 is a perspective view of an embodiment of another process with a stencil.
Figure 4:
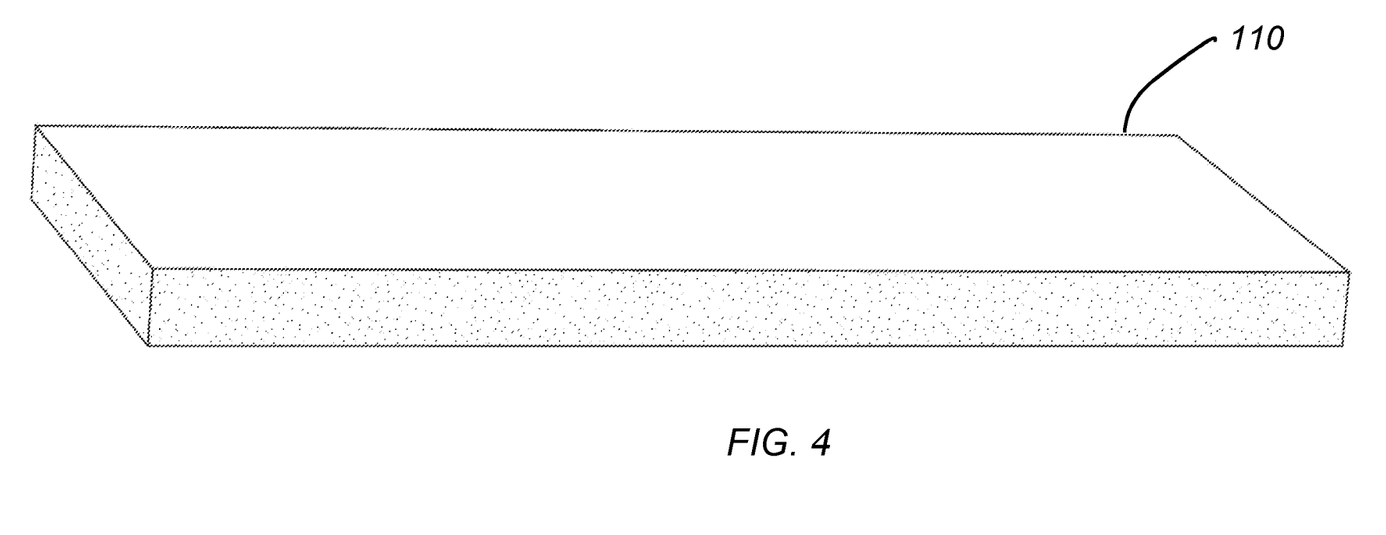
FIG. 4 is a perspective view of an embodiment of a process for curable liquid placed in the stencil.
Figure 5:
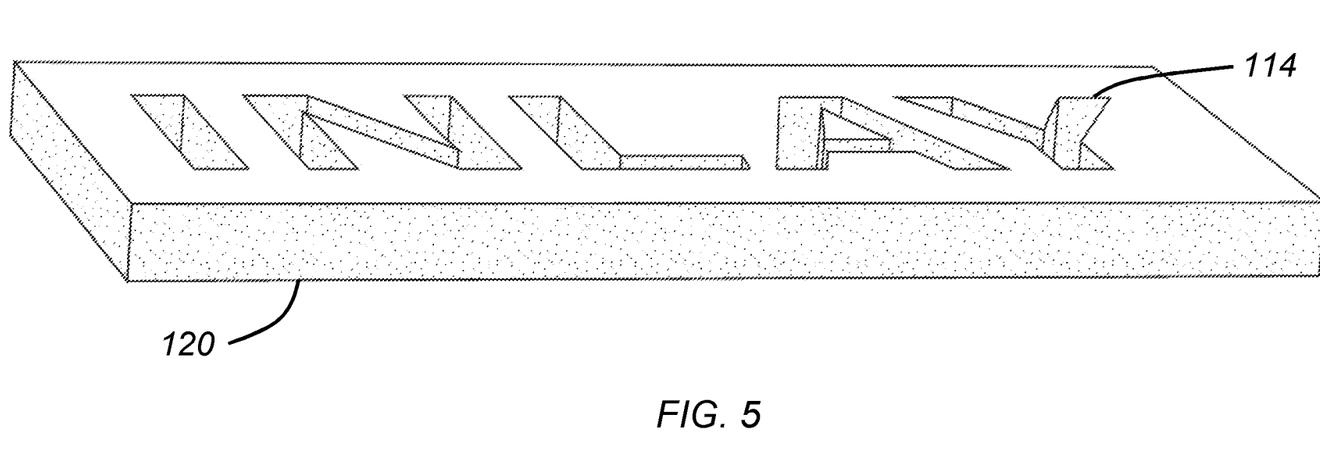
FIG. 5 is a perspective view of an embodiment of a cured composition removed from a stencil.

Referring to FIGS. 3-5, another process for forming the pocket in a structure can be used when the structure is being cast. A stencil 100 such as a frame, mold, or the like may be created to form the structure. In some aspects, the structure can include any of the structures described herein, and the composition used to form the structure can include any of the compositions as described herein. Although the stencil 100 is depicted as having substantially rectangular outer wall and lettering in the figures, any suitable shape such as a circle, triangle, hexagon, or other shape may be used with any optionally shaped or formed patterns of stencils. In some aspects, separate components or pieces can can be placed within the stencil 100 to exclude the curable liquid when curing. The stencil 100 can serve to retain the curable liquid when cast as well as excluding a curable liquid such as cement or concrete when the structure is cast. In some embodiments, the stencil 100 can be a three-dimensional CNC produced structure (a "CNC structure"). For example, various forms of computerized control can be used to produce the CNC structure such as a CNC router, a CNC mill, a CNC printer, a motorized CNC machine, a CNC laser cutter, or the like. While shown as a mold-like stencil, in some aspects, a separate stencil can be used with a curable liquid to exclude the material during curing, and the separate stencil may comprise one or more individual components that can be placed on top of a cast curable liquid rather than excluding the curable liquid in a mold form as illustrated in FIG. 3. As shown in FIG. 4, an uncured liquid such as concrete 110 can be poured into the stencil 100 to form the shape of the structure, but not be inside the portions excluded by the stencil 100. After the concrete 110 cures, the stencil 100 can be removed to reveal a cast structure having a pocket 114. In some embodiments, the pocket 114 can include a concave edge in the cured concrete structure 120. The cured concrete 120 may have a textured surface, and the surface of the stencil 100 can be used to form the texture on the surface of the pocket. An inlay can then be created within the pocket.

In some aspects, a mold such as that illustrated in FIG. 3 can be used that has the desired pocket(s) included within the mold. This may be useful for smaller structures that can be moved once they are cast. The mold can be formed of any suitable material, and in some aspects, the mold may be formed using a CNC structure. In other aspects, the mold may be flexible such as being formed from a flexible polymer. For example, a polyurethane, silicone, rubber, or other flexible materials can be used to form the mold. The mold can include structures similar to the stencil that serve to both hold the cement or concrete when the structure is case and exclude the cement or concrete from a portion of the structure to form the pocket(s). Depending on the material used to form the mold, a material such as a mold release may be used when casting the concrete or cement to reduce any sticking between the cured composition and the mold. The resulting structure removed from the mold may have the pockets formed into the structure to allow for the inlay to be cast into the pockets.

Figure 6:
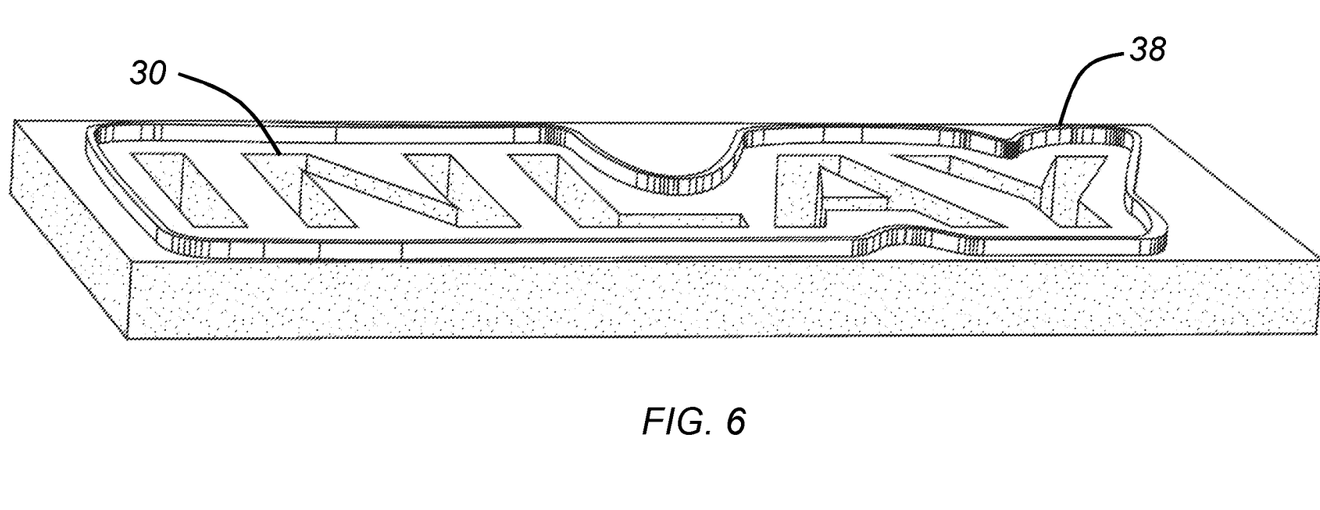
FIG. 6 is a perspective view of an embodiment of the process of the preexisting concrete structure with a dam surrounding a periphery of the pocket.
Figure 7:
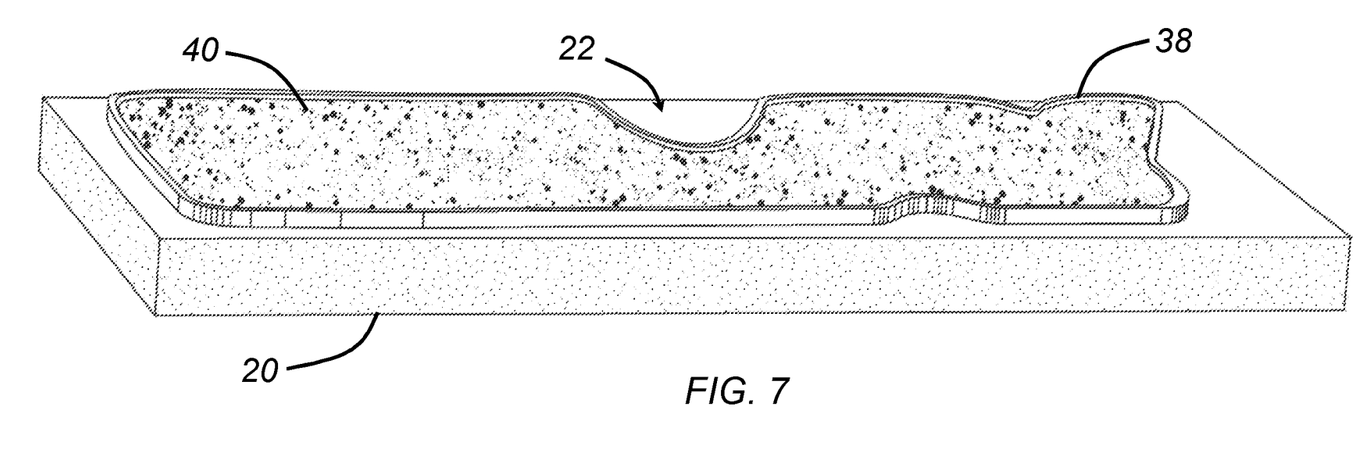
FIG. 7 is a perspective view of an embodiment of the process of the pocket filled with an uncured concrete composition to form an inlay.
Figure 8:
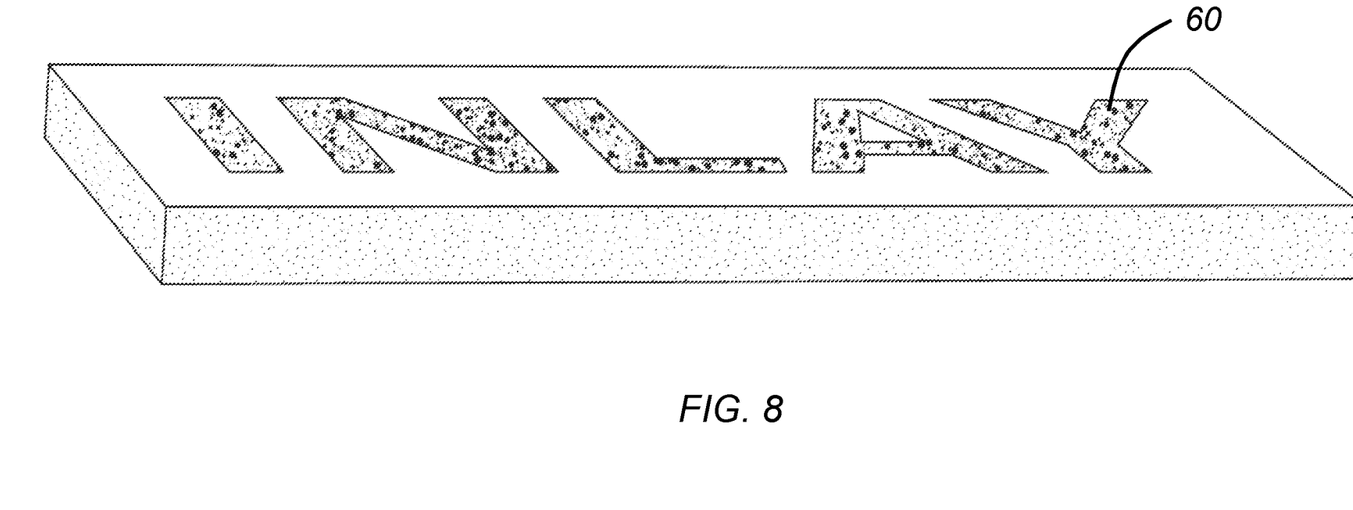
FIG. 8 is a perspective view of an embodiment of the cured composition comprising an inlay.

In order to form the inlay, a curable liquid can be poured or cast into the pocket. As shown in FIGS. 6-8, a decorative concrete inlay visually distinguishable from a preexisting cured concrete 120 and with a particle size distribution for inlaying in the preexisting cured concrete 120 can be poured in the pocket 114 and polished to correspond and be level with the textured surface in some embodiments as depicted in FIG. 8. In other embodiments, a curable liquid such as an epoxy can be poured into the pocket 114 and finished to form an epoxy inlay.

When the curable liquid is a concrete, the inlay may be poured above the level of the structure in which the pocket is formed to allow the inlay to be polished down to expose the aggregate at or near the full width of the aggregate, as described above. In order to create the height of the inlay above the surface of the structure, a dam 38 can be created around the edge 36 and an uncured concrete composition 40 may be poured into the pocket 30. The dam 38 can retain the uncured concrete mixture 40 within the pocket 30 to a desired height. The dam can be formed from any material that can be removed once the inlay composition is cured. In some embodiments, a bonding agent can be applied to the pocket 30 prior to filling the pocket 30 with the uncured concrete composition or mixture 40. In some embodiments, the uncured mixture 40 can fill the pocket 30 to a height at least about 10% above the surface 22 of the pocket 30 or concrete structure 20 or to a height at least about one-half of an average diameter of an aggregate above the surface 22 of the pocket 30 or concrete structure 20. Generally, the pocket 30 is overfilled to avoid unwanted voids after polishing. After the concrete composition 40 cures to form the inlay 60, the inlay 60 may be polished with a polisher to smooth the appearance on the inlay 60 with the surface 22 of the concrete structure 20. In some embodiments, the polishing is conducted not just over the surface of the inlay 60, but also the entire surface 22 of the concrete structure 20 to provide a smooth finish and little variation in the surface height of the inlay 60 and the concrete structure 20. Generally, any suitable grit may be used with the polisher, typically between about 25 grit to about 3,000 grit, or at least about 150 grit, and usually coarseness is minimized. In some embodiments, a coefficient of expansion of the uncured concrete composition or mixture 40 is within about 2% of a coefficient of expansion of the preexisting concrete structure 20. The inlay may be any suitable thickness, including at least about 0.25 in. (0.64 cm). The cured mixture 40 can be polished level with the surface 22 of the concrete structure 20 surrounding the pocket 30. In some embodiments, a surface of the cured mixture or inlay 60 can include a polished aggregate.

In some embodiments, the aggregate particles can have a diameter. In some embodiments, the aggregate having a plurality of particles can form at least two portions, namely a first portion comprising a part of the total number of aggregate particles and a second portion comprising a second part of the total number of aggregate particles. In some embodiments, the first portion can have an average diameter between about one-third to one-sixth of a thickness of a pocket; and the second portion can have an average diameter between about one-fiftieth to about one-sixth of the thickness of a pocket. In some embodiments, the aggregate particles of the first portion can generally be larger than the aggregate particles of the second portion.

In some aspects, a non-concrete curable liquid can be poured into the pocket. For example, the curable liquid can comprise an epoxy. A curable epoxy generally comprises an epoxy resin component, a hardener, and optionally a variety of additives. Any suitable epoxy resin can be used to fill the pocket formed as described herein. In some aspects, any of the additives described herein can be used in the epoxy such as colorants, dyes, aggregates, or the like. Further, the epoxy can be cast into the pocket to form a level above the surface of the pocket to allow the epoxy to be ground or polished to be level with the surface of the pocket. While described as epoxy, the curable liquid can comprise any other number of curable polymer materials with similar effect.

In some embodiments, multiple visually distinguishable inlays may be made. In such an instance, the first inlay may be formed using a dam positioned within the pocket. Once the inlay is cured, the dam can be removed to leave a portion of the pocket unfilled. Another dam can be used to them fill additional areas in the pocket until the entire pocket has been filed with a plurality of sections of the inlay. The ability to use different portions can allow for various shapes, images, and logos to be formed with the inlay. Further, different materials can be used for different portions of the inlay. For example, some portion of the inlay can be a cured concrete and others can be a cured polymeric material. The cured inlay as described herein can withstand various temperatures, including freezing temperatures, and pressures, and still remain contiguous with the surrounding concrete and maintain high resolution of the inlay design. The inlay can be made without resorting to expansion joints or barriers between adjacent sections of the inlays as well as without joints or barriers between the inlay(s) and the surrounding structure. This may present a continuous structure without having visual barriers. This is distinct from terrazzo finishes that require an edge between adjacent sections.

Having described various systems and methods herein, certain embodiments can include, but are not limited to:

In a first aspect, an uncured concrete composition comprises: a cementitious mixture, comprising: a Portland cement comprising two or more oxides of silicon, iron, aluminum, calcium, magnesium, sulfur, potassium, and sodium; and an optional pozzolanic material; at least one admixture comprising at least one of a strengthener, a plasticizer; or an accelerator; and an aggregate.

A second aspect can include the uncured concrete composition of the first aspect, further comprising adding an effective amount of an aqueous fluid for curing the uncured concrete composition.

A third aspect can include the uncured concrete composition of the first or second aspect, wherein the uncured concrete composition comprises: about 10% to about 70%, by weight, of the cementitious mixture; and about 30% to about 90%, by weight, of the aggregate, based on the total weight of the cementitious mixture and aggregate.

A fourth aspect can include the uncured concrete composition of the first or second aspect, wherein the uncured concrete composition comprises: about 20% to about 50%, by weight, of the cementitious mixture; and about 50% to about 90%, by weight, of the aggregate, based on the total weight of the cementitious mixture and aggregate.

A fifth aspect can include the uncured concrete composition of any one of the first to fourth aspects, wherein the uncured concrete composition comprises a weight ratio of aggregate to cementitious mixture of about 9:1 to about 1:1.

A sixth aspect can include the uncured concrete composition of any one of the first to fourth aspects, wherein the uncured concrete composition comprises a weight ratio of aggregate to cementitious mixture of about 7:1 to about 2:1.

A seventh aspect can include the uncured concrete composition of any one of the first to fourth aspects, wherein the uncured concrete composition comprises a weight ratio of aggregate to cementitious mixture of about 4:1 to about 1.5:1.

An eighth aspect can include the uncured concrete composition of any one of the first to seventh aspects, wherein the cementitious mixture comprises: about 50% to about 99%, by weight, of the portland cement; and about 1% to about 20%, by weight, of the pozzolanic material, based on the total weight of the cementitious mixture; and the at least one admixture comprises: about 1% to about 10%, by weight, of the strengthener; about 0.1% to about 5%, by weight, of the plasticizer; and about 1% to about 10%, by weight, of the accelerator, based on the total weight of the cementitious mixture.

A ninth aspect can include the uncured concrete composition of any one of the first to seventh aspects, wherein the cementitious mixture comprises: about 60% to about 90%, by weight, of the portland cement; and about 3% to about 17%, by weight, of the pozzolanic material, based on the total weight of the cementitious mixture; and the at least one admixture comprises: about 2% to about 8%, by weight, of the strengthener; about 0.1% to about 3%, by weight, of the plasticizer; and about 2% to about 8%, by weight, of the accelerator, based on the total weight of the cementitious mixture.

A tenth aspect can include the uncured concrete composition of any one of the first to ninth aspects, wherein the aggregate comprises: glass fiber.

An eleventh aspect can include the uncured concrete composition of any one of the first to tenth aspects, wherein the cementitious mixture further comprises: a polymer bonding agent.

A twelfth aspect can include the uncured concrete composition of any one of the first to eleventh aspects, wherein the aggregate comprises: a first portion; and a second portion, wherein a ratio of an average diameter of the first portion to an average diameter of the second portion is between about 1:1.75 to 1:2.5.

In a thirteenth aspect, a cured concrete structure comprises: a cured mixture formed from an uncured mixture comprising: a Portland cement comprising two or more oxides of silicon, iron, aluminum, calcium, magnesium, sulfur, potassium, and sodium; and an optional pozzolanic material; at least one admixture comprising at least one of a strengthener, a plasticizer; or an accelerator; an aggregate; and water.

A fourteenth aspect can include the structure of the thirteenth aspect, wherein the uncured concrete composition comprises about 15 to about 30%, by weight, aqueous fluid, based on the total weight of the uncured mixture.

A fifteenth aspect can include the structure of the thirteenth or fourteenth aspect, further comprising no more than about 10%, by weight, of a pigment, based on the total weight of the uncured mixture.

A sixteenth aspect can include the structure of any one of the thirteenth to fifteenth aspects, further comprising between about 0.1% to about 2%, by weight of a glass fiber based on the total weight of the uncured mixture.

A seventeenth aspect can include the structure of any one of the thirteenth to sixteenth aspects, wherein the aggregate comprises: glass fiber.

An eighteenth aspect can include the structure of any one of the thirteenth to seventeenth aspects, wherein the cementitious mixture further comprises: a polymer bonding agent.

A nineteenth aspect can include the structure of any one of the thirteenth to eighteenth aspects, wherein the aggregate comprises: a first portion; and a second portion, wherein a ratio of an average diameter of the first portion to an average diameter of the second portion is between about 1:1.75 to 1:2.5.

A twentieth aspect can include the structure of any one of the thirteenth to nineteenth aspects, wherein the aggregate comprises: a first portion; and a second portion, wherein an average diameter of the first portion is between about 5% and about 15% of a thickness of the structure, and wherein an average diameter of the second portion is between about 15% and about 35% of the thickness of the structure.

In a twenty first aspect, a process for forming an inlay in a cured concrete structure, the process comprising: forming a pocket in a preexisting concrete structure; filling the pocket with a cementitious mixture, the cementitious mixture comprising: a portland cement comprising two or more oxides of silicon, iron, aluminum, calcium, magnesium, sulfur, potassium, and sodium; an optional pozzolanic material; an admixture comprising at least one of a strengthener;

a plasticizer, or an accelerator; and an aggregate; and curing the mixture in the pocket to form a cured mixture; and polishing the cured mixture in the pocket.

A twenty second aspect can include the process of the twenty first aspect, where the pocket has a thickness, and wherein the thickness is between about 0.1 in to about 1 in.

A twenty third aspect can include the process of the twenty first or twenty second aspect, wherein an aggregate has an average diameter, and wherein the average diameter is less than or equal to one-third of a thickness of the pocket.

A twenty fourth aspect can include the process of any one of the twenty first to twenty third aspects, further comprising applying a bonding agent to the pocket prior to filling the pocket with the uncured mixture.

A twenty fifth aspect can include the process of any one of the twenty first to twenty fourth aspects, wherein an aggregate comprises: a first portion having an average diameter between about one-third to one-sixth of a thickness of the pocket; and a second portion having an average diameter between about one-fiftieth to about one-sixth of the thickness of the pocket.

A twenty sixth aspect can include the process of the twenty fifth aspect, wherein the first portion comprises between about 40% to about 60% by volume of the aggregate.

A twenty seventh aspect can include the process of any one of the twenty first to twenty sixth aspects, wherein forming the pocket comprises: etching the concrete structure to form the pocket.

A twenty eighth aspect can include the process of any one of the twenty first to twenty seventh aspects, wherein forming the pocket comprises: disposing a stencil in a surface of an uncured concrete; curing the uncured concrete to form the concrete structure; and removing the stencil from the concrete structure to form the pocket.

A twenty ninth aspect can include the process of the twenty eighth aspect, wherein the stencil comprises a CNC structure.

A thirtieth aspect can include the process of any one of the twenty first to twenty ninth aspects, wherein the pocket comprises a concave edge in the concrete structure.

A thirty first aspect can include the process of any one of the twenty first to thirtieth aspects, wherein a surface of the concrete structure in the pocket has a textured surface.

A thirty second aspect can include the process of any one of the twenty first to thirty first aspects, wherein filling the pocket with the mixture comprises filling the pocket with the mixture to a height at least about 10% above a surface of the pocket.

A thirty third aspect can include the process of any one of the twenty first to thirty second aspects, wherein filling the pocket with the mixture comprises filling the pocket with the mixture to a height at least about one half of an average diameter of the aggregate above a surface of the pocket.

A thirty fourth aspect can include the process of any one of the twenty first to thirty third aspects, further comprising: forming a dam around a perimeter of the pocket, wherein filling the pocket with the mixture comprises: filling the pocket with the mixture, and retaining the mixture in the pocket using the dam.

A thirty fifth aspect can include the process of any one of the twenty first to thirty fourth aspects, wherein a coefficient of expansion of the mixture is within about 2% of a coefficient of expansion of the concrete structure.

A thirty sixth aspect can include the process of any one of the twenty first to thirty fifth aspects, wherein a coefficient of expansion of the aggregate is within about 2% of a coefficient of expansion of the cured mixture.

A thirty seventh aspect can include the process of any one of the twenty first to thirty sixth aspects, wherein the aggregate comprises between about 60% to about 80% by volume of the mixture.

In a thirty eighth aspect, a composite having an inlay and a preexisting concrete structure, comprises: a pocket formed in the preexisting concrete structure; a cured mixture disposed in the pocket and bonded to the preexisting concrete structure, wherein the cured mixture made by comprising: a cementitious mixture, comprising: a Portland cement comprising two or more oxides of silicon, iron, aluminum, calcium, magnesium, sulfur, potassium, and sodium; and a silica fume; and at least one admixture comprising: a strengthener; a plasticizer; and an accelerator; and an aggregate, wherein the uncured concrete composition is selected to be visually distinguishable from the preexisting concrete structure and with a particle size distribution for inlaying in the preexisting concrete structure.

A thirty ninth aspect can include the inlay of the thirty eighth aspect, wherein the cured mixture is polished level with a surface of the concrete surrounding the pocket.

A fortieth aspect can include the inlay of the thirty eighth or thirty ninth aspect, wherein a surface of the cured mixture comprises polished aggregate.

A forty first aspect can include the inlay of any one of the thirty eighth to fortieth aspects, where the pocket has a thickness, and wherein the thickness is between about 0.75 to about 0.1 inches.

A forty second aspect can include the inlay of any one of the thirty eighth to forty first aspects, wherein the aggregate has an average diameter, and wherein the average diameter is less than or equal to one third of a thickness of the pocket.

A forty third aspect can include the inlay of any one of the thirty eighth to forty second aspects, wherein the aggregate is a structural aggregate.

A forty fourth aspect can include the inlay of any one of the thirty eighth to forty third aspects, wherein the pocket comprises a concave edge in the concrete structure.

A forty fifth aspect can include the inlay of any one of the thirty eighth to forty fourth aspects, wherein a surface of the concrete structure in the pocket has a textured surface.

A forty sixth aspect can include the inlay of any one of the thirty eighth to forty fifth aspects, wherein a coefficient of expansion of the mixture is within about 2% of a coefficient of expansion of the concrete structure.

A forty seventh aspect can include the inlay of any one of the thirty eighth to forty sixth aspects, wherein a coefficient of expansion of the aggregate is within about 2% of a coefficient of expansion of the cured mixture.

A forty eighth aspect can include the inlay of any one of the thirty eighth to forty seventh aspects, wherein the aggregate comprises: a first portion having an average diameter between about one third to one sixth of a thickness of the pocket; and a second portion having an average diameter between about one fiftieth to about one sixth of the thickness of the pocket.

A forty ninth aspect can include the inlay of the forty eighth aspect, wherein the first portion comprises between about 40% to about 60% by volume of the aggregate.

A fiftieth aspect can include the inlay of any one of the thirty eighth to forty ninth aspects, wherein the aggregate comprises between about 60% to about 80% by volume of the mixture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

For purposes of the disclosure herein, the term "comprising" includes "consisting" or "consisting essentially of" Further, for purposes of the disclosure herein, the term "including" includes "comprising," "consisting," or "consisting essentially of."

As used herein, the term "total dry weight" can mean the total weight of a cementitious mixture, any admixture, and aggregate in an uncured concrete composition.

As used herein, the term "and/or" can mean one or more of items in any combination in a list, such as "A and/or B" means "A, B, or the combination of A and B".

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Consistent with statements made above, the use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

Could be translated into epoxy, backfill into other materials. Plastic with color. Polyspartic epoxy.

What is claimed is:

1. A process for forming an inlay in a cured concrete structure, the process comprising:
    forming a pocket in a preexisting concrete structure;
    filling the pocket with a mixture, wherein filling the pocket with the mixture comprises filling the pocket with the mixture to a height at least about one half of an average diameter of the aggregate above a surface of the preexisting concrete structure, and wherein the mixture comprises:
        a Portland cement comprising two or more oxides of silicon, iron, aluminum, calcium, magnesium, sulfur, potassium, and sodium;
        an admixture comprising at least one of a strengthener; a plasticizer, or an accelerator; and
        an aggregate; and
    curing the mixture in the pocket to form a cured mixture; and
    polishing the cured mixture in the pocket approximately level with the surface of the preexisting concrete structure.

2. The process of claim 1, wherein the mixture comprises a cementitious mixture, and wherein the cementitious mixture comprising:
    a Portland cement comprising two or more oxides of silicon, iron, aluminum, calcium, magnesium, sulfur, potassium, and sodium;
    an admixture comprising a plurality of: the strengthener; the plasticizer, or the accelerator; and
    an aggregate, wherein the aggregate comprises a portion having an average diameter between about one-third to one-sixth of a thickness of the pocket.

3. The process of claim 1, wherein the pocket has a thickness, and wherein the thickness is between about 0.1 in to about 1 in.

4. The process of claim 2, wherein the aggregate has an average diameter, and wherein the average diameter is less than or equal to one-third of a thickness of the pocket.

5. The process of claim 2, further comprising applying a bonding agent to the pocket prior to filling the pocket with the uncured mixture.

6. The process of claim 2, wherein the aggregate comprises:
    a first portion having an average diameter between about one-third to one-sixth of a thickness of the pocket; and
    a second portion having an average diameter between about one-fiftieth to about one-sixth of the thickness of the pocket.

7. The process of claim 6, wherein the first portion comprises between about 40% to about 60% by volume of the aggregate.

8. The process of claim 1, wherein forming the pocket comprises:
    etching the concrete structure to form the pocket.

9. The process of claim 1, wherein forming the pocket comprises:
    disposing a stencil in a surface of an uncured concrete;
    curing the uncured concrete to form the concrete structure;
    removing the stencil from the concrete structure to form the pocket.

10. The process of claim 1, wherein the pocket comprises a concave edge in the concrete structure and wherein a surface of the concrete structure in the pocket has a textured surface.

11. The process of claim 1, further comprising:
forming a dam around a perimeter of the pocket, wherein filling the pocket with the mixture comprises: filling the pocket with the mixture, and retaining the mixture in the pocket using the dam.

12. The process of claim 1, wherein a coefficient of expansion of the mixture is less than a coefficient of expansion of the concrete structure.

13. The process of claim 1, wherein the aggregate comprises between about 60% to about 80% by volume of the mixture.

14. The process of claim 1, wherein the mixture comprises a curable polymeric material.

15. A composite having an inlay in a preexisting concrete structure, comprising:
a pocket formed in the preexisting concrete structure;
a cured mixture disposed in the pocket and bonded to the preexisting concrete structure, wherein the cured mixture is polished level with a surface of the concrete surrounding the pocket, and wherein the cured mixture comprises:
a cementitious mixture, comprising:
a Portland cement comprising two or more oxides of silicon, iron, aluminum, calcium, magnesium, sulfur, potassium, and sodium;
an aqueous fluid; and
at least one admixture comprising:
a strengthener,
a plasticizer, and
an accelerator; and
an aggregate.

16. The inlay of claim 15, wherein the cured mixture and the surface of the concrete surrounding the pocket are polished level.

17. The inlay of claim 15, wherein the pocket has a thickness, and wherein the thickness is between about 0.75 to about 0.1 inches.

18. The inlay of claim 15, wherein the aggregate has an average diameter, and wherein the average diameter is less than or equal to one third of a thickness of the pocket.

19. The inlay of claim 15, wherein the aggregate comprises:
a first portion having an average diameter between about one third to one sixth of a thickness of the pocket; and
a second portion having an average diameter between about one fiftieth to about one sixth of the thickness of the pocket.

20. A composite having an inlay in a preexisting concrete structure, comprising:
a pocket formed in the preexisting cured concrete structure;
a cured mixture disposed in the pocket and bonded to the preexisting concrete structure, wherein the cured mixture and the preexisting cured concrete structure are both polished level, and wherein the cured mixture comprises:
a cementitious mixture, comprising:
a Portland cement comprising two or more oxides of silicon, iron, aluminum, calcium, magnesium, sulfur, potassium, and sodium;
an aqueous fluid; and
at least one admixture comprising:
a strengthener,
a plasticizer, and
an accelerator; and
an aggregate, wherein the aggregate comprises between about 60% to about 80% by volume of the cementitious mixture.

* * * * *